STEREOPHONIC SOUND RECEIVER SYSTEM

Filed Nov. 13, 1959

2 Sheets-Sheet 1

INVENTOR.
JACK AVINS
BY Eugene M. Whitacre
ATTORNEY

March 5, 1963 J. AVINS 3,080,453

STEREOPHONIC SOUND RECEIVER SYSTEM

Filed Nov. 13, 1959 2 Sheets-Sheet 2

INVENTOR.
JACK AVINS
BY Eugene M. Whitacre
ATTORNEY

United States Patent Office 3,080,453

Patented Mar. 5, 1963

3,080,453

STEREOPHONIC SOUND RECEIVER SYSTEM

Jack Avins, Staten Island, N.Y., assignor to Radio Corporation of America, a corporation of Delaware Filed Nov. 13, 1959, Ser. No. 852,712
6 Claims. (Cl. 179—15)

This invention relatees to stereophonic signal receiving systems, and in particular to stereophonic signal receivers for translating a received radio frequency carrier wave which is amplitude modulated in accordance with one of a pair of stereophonically related signals, and concurrently angle modulated in accordance with the other of said stereophonically related signals.

A pair of stereophonically related signals from any suitable source such as a pair of spaced microphones may be respectively designated as the A and B signals. In one type of stereophonic signal transmission system, the A and B signals are subtracted to form an $(A-B)$ signal which is utilized to angle modulate the carrier wave. The A signal is added to the B signal to provide an $(A+B)$ signal which is utilized to amplitude modulate the angle modulated carrier wave. A monophonic receiver may receive and detect as amplitude modulation the $(A+B)$ signal. A stereophonic receiver detects the amplitude modulation on the carrier wave to obtain the $(A+B)$ signal and detects the angle modulation of the wave to obtain the $(A-B)$ signal. By matrixing the $(A+B)$ and $(A-B)$ signals, the individual A and B signals may be recreated and, after amplification, each supplied respectively to one of a pair of reproducers, such as loudspeakers, to provide stereophonic sound reproduction.

The receiving apparatus of such a system may include a common tuner and an intermediate frequency amplifier channel, the output of which includes a tuned circuit across which the angle and amplitude modulated intermediate frequency (IF) carrier wave is developed. The amplitude modulation (AM) processing channel and the angle modulating processing channel are each coupled to the tuned circuit and are energized by the modulated wave developed thereacross.

The detector in the AM channel may include a unilateral conducting device coupled to this tuned circuit. The amplitude modulation on the wave causes corresponding variations in the current conduction of the device which variations are utilized to provide the $(A+B)$ component. However these variations in the current conduction of the device may reflect a variation in the impedance shunting the tuned circuit, and cause an incidental phase modulation to be imposed upon the IF wave substantially in the rhythem of the AM. Because the angle modulation channel derives its input from this IF wave, the shunting of the AM detector across the tuned circuit may give rise to a distortion component related to the AM, at the output of the angle modulation channel. For example, with one particular circuit arrangement of this type, under conditions of zero angle modulation, i,e., $(A-B)$ signal equal to zero at the transmitter, and with the $(A+B)$ signal component of such magnitude as to amplitude modulate the transmitter 80%, a crosstalk output was obtained from the receiver angle modulation channel of an amplitude corresponding to 5% $(A-B)$ modulating signal at the transmitter.

The angle modulation detection channel likewise may include a unilateral conducting device at its input which is coupled to the tuned circuit. In a similar manner to the above described effects of the device in the AM channel, the AM on the wave causes variations in the conduction of the device in the angle modulation detection channel. These current variations may introduce an incidental phase modulation component on the IF wave developed across the said tuned circuit i.e., may cause the generation of spurious angle variation components by the tuned circuit, which incidental modulation may give rise to distortion or crosstalk components in the output of the angle modulation detection channel.

The above described incidental phase modulation produced by cyclical variations in the current of a unilateral conducting device, are of importance in a stereo system of the type described. However in prior monophonic angle modulation systems employed for broadcasting, the production in the receiver of such incidental modulation is of no practical consequence. This follows because in prior monophonic frequency modulation (FM) broadcast and TV sound broadcast, the swing is very large and the only amplitude modulation on the angle modulated carrier wave is incidental due mainly to variations in the transmission path, to variations in the receiver band pass, and to noise. Accordingly the incidental phase modulation produces a detected output which is so far below the detected output due to the desired modulation as to be negligible. On the other hand, in the stereo system described, the angle modulation is relatively very much lower and moreover the wave is concurrently amplitude modulated by the $(A+B)$ signal. This results in the incidental phase modulation developing an output at the stereo system angle modulation detector of appreciable magnitude compared to the output resulting from the original angle modulation.

The signal amplitude at the output of the angle modulation detector of a particular sensitivity is primarily a function of the amount of carrier wave angle modulation whereas the amplitude at the output of the amplitude modulation detector is a function of the average received carrier wave level as well as the percentage of AM. Because the automatic gain control (AGC) is only partially effective, the received carrier level may vary from station to station, or be subject to fading or the like and the amplitude relation of the detected $(A+B)$ signal may vary with respect to that of the detected $(A-B)$ signal. If such unbalanced signals are processed by the matrixing network, a portion of the B signal is undesirably reproduced by the loudspeaker which is supposed to reproduce the A signal, and vice versa.

To overcome this difficulty, it is proposed that dynamic limiting means be employed in the angle modulation channel to automatically track variations in the amplitude of the carrier wave that occur at a rate less than that of the lowest signal frequency. Since the output level of the angle modulation detector is a function of applied level as well as the extent of angle modulation of the carrier wave, the detected signal output amplitude from the angle modulation channel can be made to track that of the amplitude modulation channel. The dynamic limiting circuit includes a self-biasing network having a charge and discharge time constant of value to render the output of the limiting circuit substantially constant despite relatively rapid variations in amplitude of the received wave, thus precluding the passage to the angle modulation detector of wave amplitude variations which occur at the rates within the range of the signal frequencies. The dynamic limiter thus serves to eliminate the amplitude modulated $(A+B)$ signal and audible spurious AM noise signals from the angle modulated wave prior to demodulation of the angle modulated wave by the angle modulation detector.

An object of this invention is to provide an improved stereophonic signal receiving system.

Another object of this invention is to provide an improved stereophonic signal receiver for a radio frequency carrier wave which is modulated in both amplitude and angle by a pair of stereophonically related signals, and which receiver has an amplitude modulation signal channel and an angle modulation signal channel the signal outputs of which bear substantially the same relationship as when introduced at the transmitter despite variations in the received level of said carrier wave.

Still a further object of this invention is to provide an improved stereophonic signal receiver for a radio frequency carrier wave which is modulated in amplitude by a signal and in angle by a stereophonically related signal wherein crosstalk introduced by the receiver is minimized.

In accordance with an embodiment of the invention, a stereophonic sound receiver comprises a common channel, the output of which includes a tuned circuit across which is developed an undetected radio frequency wave having amplitude modulation components and angle modulation components. Separate amplitude modulation and angle modulation detection channels are coupled to the tuned circuit. The amplitude modulation channel has a detector including a unilateral conducting device, and the angle modulation channel includes a pair of unilateral conducting devices in an amplitude limiting circuit therefor, both of which are coupled to the tuned circuit. Relatively high impedances are connected in the coupling path between the tuned circuit and the unilateral conducting devices in the amplitude modulation and angle modulation channels respectively to prevent changes in the loading of the tuned circuit as the conductivity of the devices change. In this manner, the generation of incidental phase modulation which would deleteriously affect the angle modulated signal is reduced, and any alteration that the limiter might cause to the amplitude modulation component at the amplitude modulation detector is likewise substantially avoided.

A feature of this invention is the provision of improved dynamic limiting means in the angle modulation channel prior to the angle modulation detector stage. The limiting means functions to preclude rapid variations in amplitude of the received wave from appearing at the angle modulation detector, but automatically adjusts itself to limit the received wave in accordance with the tracked variations in amplitude of the wave which occur at a rate less than the lowest signal frequency.

The invention is described in greater detail with reference to the drawing in which.

Figure 1:
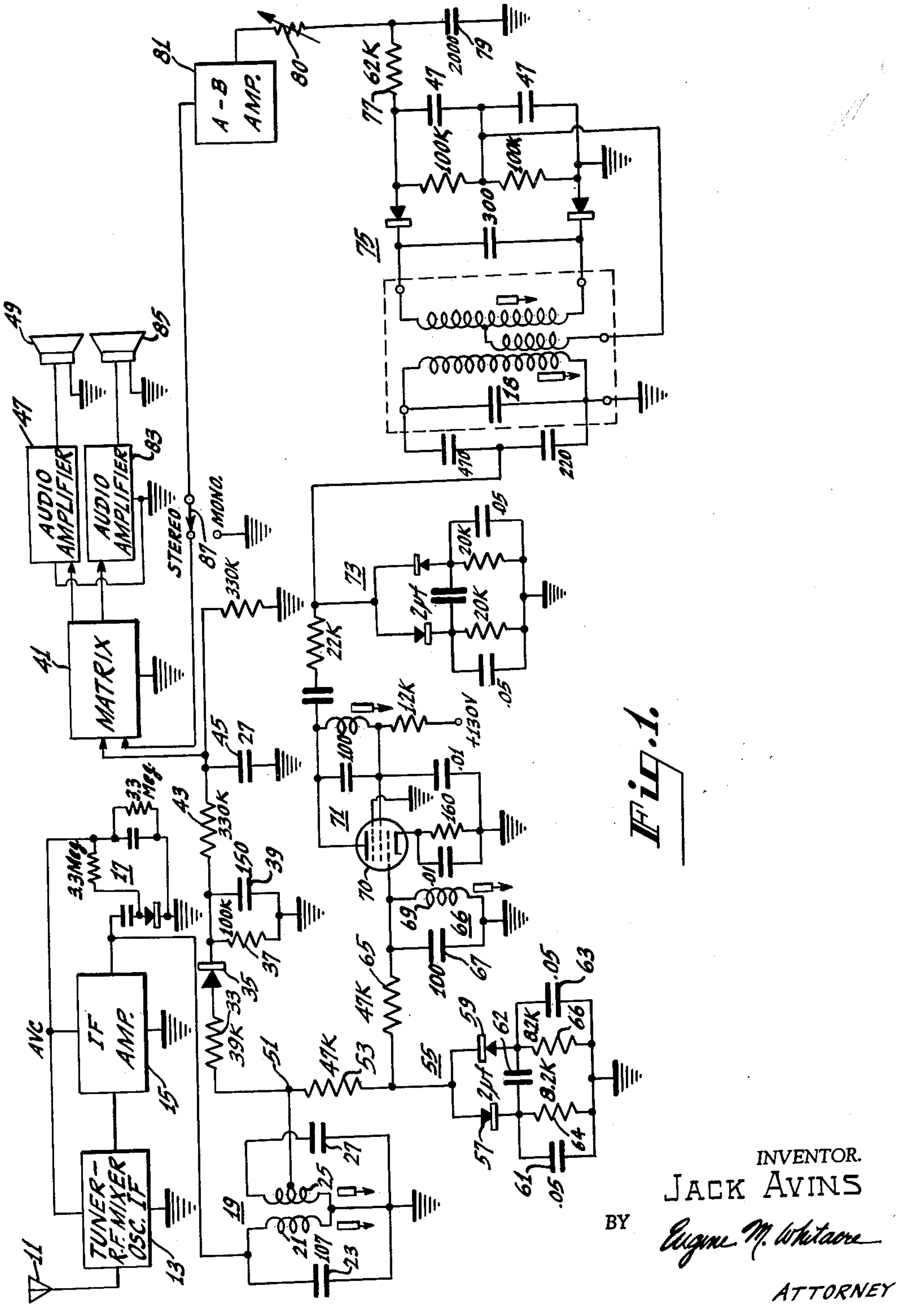
FIGURE 1 is a schematic circuit diagram of a stereophonic receiver circuit in accordance with one embodiment of the invention.

With reference to the drawings, wherein like reference numerals are used to designate the same circuit components throughout, and particularly to FIGURE 1, a stereophonic signal receiver comprises an antenna 11 which intercepts a radio frequency wave and supplies it to a tuner including a radio frequency mixer and oscillator, and a first intermediate frequency amplifier stage all shown in block 13 for the purpose of convenience, since such circuits are well known. A second intermediate frequency amplifier 15 further amplifies the wave and applies it to an automatic gain control circuit 17 and a double tuned transformer 19. The automatic gain control circuit 17 shown is known in the art.

The transformer 19 includes a slug tuned primary winding 21 and a slug tuned secondary winding 25, resonated respectively by capacitors 23 and 27 to the receiver intermediate frequency. The signal from the intermediate frequency amplifier 15 is applied across the primary winding 21. One side of the primary and secondary windings 21, 25 are connected to ground or to a point of reference potential for the receiver.

The modulated intermediate frequency wave containing both the amplitude and angle modulation components is taken from an intermediate tap point on the secondary winding 25 and applied through a terminal point 51 to the amplitude modulation detection channel and the angle modulation detection channel.

The undetected wave is directed from the terminal 51 through a resistor 33 to the anode of unilateral conductive device 35 in the amplitude modulation detection channel. The resistor 33 presents to the intermediate frequency transformer 19 secondary circuit a high impedance relative to the impedance of the diode 35 in its forward conductive direction. Due to the presence of the resistor 33, changes in conductivity of the diode 35 which vary the diode impedance do not cause substantial changes in the impedance shunting the intermediate frequency transformer 19 secondary circuit and as previously described therefore such conductivity changes cause no appreciable incidental phase modulation to be developed on the IF wave.

Current pulses flowing through the diode 35 develop the amplitude modulating signal across the load resistor 37 and load capacitor 39. Connected in parallel across the load resistor 37-capacitor 39 combination is a series circuit including a filter resistor 43 and capacitor 45 to effectively integrate and delay the detected amplitude modulation signal, which then is fed as one of a pair of signals to the matrixing circuit 41. The detected amplitude modulation signal is the $(A+B)$ signal, previously mentioned.

The undetected wave is also applied from the terminal 51 at the output of the intermediate frequency transformer 19 secondary circuit to an angle modulation channel. Specifically, the signal passes from the terminal 51 through resistor 53 to a dynamic limiter 55. The dynamic limiter 55 comprises two branches, each having a unilateral conductive device 57, 59 and an associated RC network. The ohmic value of resistor 53 is made considerably higher than the forward impedance of the devices 57, 59 and serves the same purpose as the resistor 33 by presenting a relatively fixed load impedance to the tuned circuit 19 despite variations in the impedance of the diodes 57 and 59 of the limiter 55.

The dynamic limiter 55 provides automatic tracking of variations of the carrier wave amplitude that occur at a rate below the lowest signal frequency during transmission of the radio frequency wave.

In operation when the carrier wave which is applied to the limiter 55 goes positive, the diode 57 conducts charging capacitor 61 connected between the cathode of diode 57 and ground so that the polarity of the terminal of 61 connected to cathode is rendered positive with respect to ground. Because capacitor 62 in series with capacitor 63 is connected in shunt with 61, capacitor 62 receives a charge which develops a positive potential on the terminal of capacitor 62 connected to the cathode of diode 57 with respect to the other terminal of capacitor 62. On the other half of the R.F. cycle, the carrier wave which is applied to the limiter 55 goes negative, diode 59 conducts charging capacitor 63, connected between the anode of diode 59 and ground, so that the polarity of the terminal of 63 connected to the anode of diode 59 is rendered negative with respect to ground. Because the series combination of capacitor 62 and capacitor 61 is in shunt with capacitor 63, capacitor 62 receives a charge which develops a negative potential on the terminal of capacitor 62 connected to the anode of diode 59 with respect to the other terminal of capacitor 62. It will be appreciated that neglecting both the source impedance, i.e., the impedance between the tap on the secondary of transformer 19 and ground, and the forward impedance of the diodes 57 and 59 because the value of resistor 53 is chosen high compared to these impedances, capacitor 62 is charged in the same direction through resistor 53 on both the negative half and positive half cycle of the R.F. wave. The charging time constant in seconds for the component values shown by way of illustration in FIGURE 1 is 47,000Ω times $2\times10^{-6}$ farads or 0.1 second and the discharge time constant in seconds is 16,400Ω times $2\times10^{-6}$ farads or .04 second. These time constant values are given merely by way of illustration and may be altered over a substantial range provided the time constant values are longer than the period of the lowest frequency components of the modulating signals A and B as will be explained hereinafter.

Provided the peak-to-peak amplitude of the wave developed between terminal 51 and ground does not vary, a substantially constant potential is developed across capacitor 62. The diode devices 57 and 59 are each back biased, i.e., biased in their lower conductive direction, in an amount equal to one-half of this potential.

The impedance of the resonant circuit including the capacitor 67, inductance coil 69 and the input capacity of tube 70, is very high compared to resistor 53 at the wave frequency. That portion of the R.F. wave developed between 51 and ground, having a peak-to-peak value below the bias potential established across 62, is developed substantially without attenuation between the junction of resistors 53 and 65 and ground. However that portion exceeding the bias potential sets up a flow of current in the limiter which current causes a potential drop across resistor 53, greatly attenuating the portion of the R.F. cycle that exceeds the self-bias.

The dynamic limiter 55 in conjunction with the resistor 53 acts in the manner of a variable voltage divider which translates the sinusoidal carrier wave cycles into clipped sine waves. These are filtered by resistor 65 and resonant circuit 66 into sinusoidal variations at carrier wave frequency and supplied to the grid-cathode circuit of tube 70.

When the peak-to-peak voltage wave developed between the terminal 51 and ground increases momentarily i.e., at a rate above the lowest modulating frequency, the bias potential across capacitor 62 remains substantially unchanged and the wave supplied to the input of tube 70 remains at the amplitude value it was prior to the momentary increase. However when the peak-to-peak voltage wave developed between the terminal 51 and ground increases in a sustained manner i.e., at a rate below the lowest modulating frequency, the capacitor 62 acquires sufficient additional charge to increase the bias potential to a value which permits the passage of a clipped sine wave of correspondingly greater peak-to-peak amplitude to the filter network 65, 66. That is, substantially the same percentage of the voltage wave developed between the terminal 51 and ground as was originally developed is maintained at the junction of the diodes and resistor 53.

When the peak-to-peak amplitude between terminal 51 and ground decreases momentarily, the bias developed across the capacitor 62 is unchanged in value and the sinusoidal wave is limited nearer its peaks so that the peak-to-peak amplitude of the clipped sine wave is unaffected. However when the peak-to-peak amplitude decreases in a sustained manner some of the accumulated charge on the capacitor 62 leaks off so that the bias potential stabilizes at a lower value, and the original percentage of the wave that was originally passed to the filter is passed. Thus it is seen that when the voltage wave developed between terminal 51 and ground is decreased or increased at a rate lower than the lowest modulating frequencies, the peak-to-peak level of the angle modulated wave supplied to stage 71 decreases or increases correspondingly. However, when the increase or decrease occurs at a rate above that corresponding to the lowest modulating frequency, the peak-to-peak level supplied to stage 71 is held substantially constant.

The dynamically limited wave is amplified by the amplifier stage 71 and is supplied to a second dynamic limiter 73 which operates in the same manner as the limiter 55. Thereafter, the wave is applied to an angle modulation detector 75 wherein the angle modulated signal is demodulated and applied to a de-emphasis network comprising a resistor 77 and capacitor 79. The detector 75 is of the type that provides an output which is a function of both the angle modulation and the amplitude modulation on the wave impressed on its input. However, because of the dynamic limiter action, the amplitude modulation on the input wave is only that modulation on the received wave occurring at a rate below the lowest signaling frequency, since the amplitude modulation occurring at a rate within the signal frequency range or above it has been removed by the dynamic limiting action. An adjustable amount of the detected signal is directed to the matrixing circuit 41 via adjustable resistor 80 and amplifier 81 as the second of the pair of input signals thereto. The matrixing network both adds and subtracts the $(A+B)$ and $(A-B)$ signals applied thereto to derive the original A and B signals. The A and B signals are amplified respectively by the amplifiers 47 and 83 before application to the loudspeakers 49 and 85.

In operation, resistor 80 is adjusted to furnish the proper amplitude of $(A-B)$ signal to the matrix 41 to balance the $(A+B)$ signal supplied to matrix 41 by the $(A+B)$ channel. The adjustment of resistor 80 is such as to provide null matrix output to the audio amplifier that energizes the "A" reproducer when the input to the "A" pickup at the transmitter is zero. The adjustment of course provides simultaneously null output to the audio amplifier that energizes the "B" reproducer when the input to the "B" pickup at the transmitter is zero.

A switch 87 is provided in the receiver whereby only the detected amplitude modulated portion of the signal is passed to the matrixing circuit when it is desired to receive a monophonic signal. When the switch 87 is connected in the "Mono" or monophonic position, the output of the angle modulation channel is shorted to ground and the amplitude modulation channel passes its signal to the matrixing circuit to the exclusion of the angle modulated signal. When the switch 87 is in the "stereo" position the angle modulation channel also supplies signal to the matrixing circuit.

Figure 2:
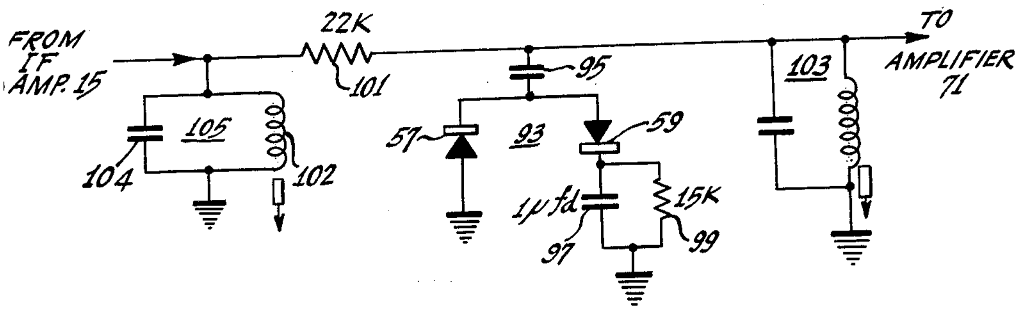
FIGURE 2 is a schematic circuit diagram of a dynamic limiter in accordance with one aspect of the invention.

In FIGURE 2, there is shown another form of dynamic limiting means which utilizes fewer components than the corresponding circuits of FIGURE 1, and which may be effectively employed in the angle modulation channel of a stereophonic receiver. The dynamic limiter 93 of FIGURE 2 comprises diodes 57 and 59, a coupling capacitor 95 and a network having a parallel-connected capacitor 97 and resistor 99. The coupling capacitor 95 has one terminal connected to the junction between the cathode of the diode 57 and the anode of the diode 59, and the other terminal connected to the junction between a resistor 101 and a tuned output circuit 103 for the limiter 93.

The operation of the circuit of FIGURE 2 is substantially similar to that previously described for the corresponding circuit in FIGURE 1. However in FIGURE 2, the impedance of the tuned circuit 105 is lower than that of the tuned circuit 25, 27, FIGURE 1 because the $L/C$ ratio and/or the Q is chosen to have a lower value. By the use of such a lower impedance tuned circuit the IF output may be derived from across the entire circuit and the tap shown in FIGURE 1 may be eliminated. Resistor 101 is for the described purpose of resistor 53 in FIGURE 1. The capacitance of capacitor 95 is chosen to offer low impedance to wave frequency and may be of the order of 0.1 microfarad.

The negative peaks of the carrier wave developed across 105 set up a flow of current through diode device 57 charging capacitor 95. The terminal of capacitor 95 connected to resonant circuit 103 is at ground direct potential. Accordingly, the other terminal of capacitor 95 is positive with respect to ground due to the aforementioned current flow, and capacitor 97 charges through diode 59, rendering the ungrounded terminal of capacitor 97 positive with respect to ground.

The positive peaks of the wave set up a flow of current through diode 59 charging capacitor 97 in the same direction as it is charged during the negative peaks.

In operation, the potential of the junction of the diodes and capacitor 95 is positive with respect to ground by one-half the bias potential developed across capacitor 97. The discharge time constant of the circuit is determined by resistor 99 and the charge time constant by resistor 101 as previously explained in connection with the corresponding elements in FIGURE 1.

Dynamic limiter 93 performs the same function dynamic limiter 55 previously described. Amplitude variations occurring at a rate above the lowest signal frequency are not transmitted to output circuit 103, but amplitude variations occurring at a rate below the lowest signal frequency are transmitted to circuit 103.

Figure 3:
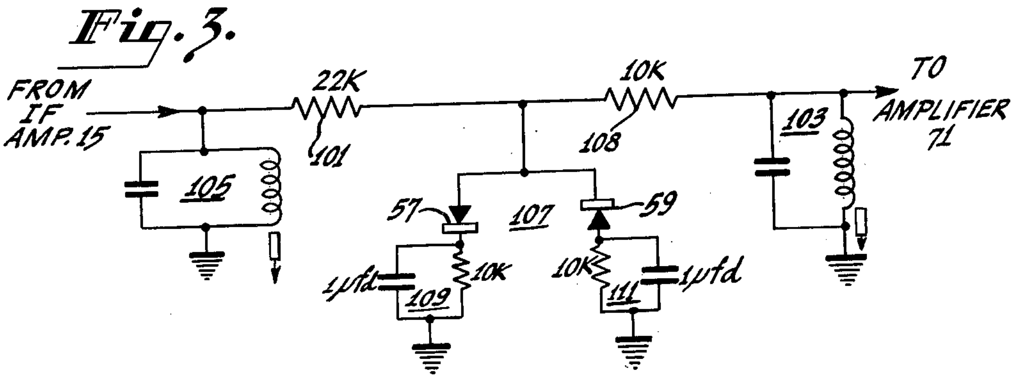
FIGURE 3 is a schematic circuit diagram of a modification of the dynamic limiter shown in FIGURE 2.

Referring now to FIGURE 3 there is shown an alternative dynamic limiting circuit which may be used for automatic tracking of variations in carrier wave amplitude occurring at a rate below the lowest signal frequency, and for automatically adjusting the level of the angle modulated detected signal. The carrier wave is applied from across the tuned circuit 105 to the limiter 107 through the large resistor 101 as in FIGURE 2. The dynamic limiter 107 comprises diodes 57 and 59 with their respective anode and cathode connected together and to the resistor 101, and time constant networks 109 and 111 coupled to the respective anode and cathode of diodes 57 and 59. The RC network 109 is connected to the cathode of the diode 57, and the RC network 111 is connected to the cathode of the diode 59. The junction intermediate the anode of diode 57 and the cathode of diode 59 is coupled to a terminal between the large resistor 101 and a resistor 103.

The limiter 107 of FIGURE 3 operates substantially as the limiting circuit illustrated in FIGURE 2 except that capacitor 62 has been eliminated and the capacitance value of capacitors 61 and 63 has been increased sufficiently to provide the required charge and discharge time constants for dynamic limiter 107. It will be observed that in FIGURE 3 independent self-biasing potentials for diode 57 (determined by 109) and for diode 59 (determined by 111) are provided. For symmetrical limiting of the positive and negative half-cycles of the input wave the values of the respective elements of the two networks should be equal. This follows because diode 57 and network 109 are effective to control the positive half-cycle and diode 59 and network 111 the negative half-cycle of the input wave.

It is understood that the values for the components indicated in FIGURES 1 through 3 are merely illustrative and that the invention is not limited to these particular values.

In broadcast receivers as known today, the automatic gain control circuit does not provide a perfect or complete adjustment for carrier strength variations of a radio frequency wave. Therefore, in a stereophonic receiver the $(A+B)$ output signal level changes as the applied carrier signal level changes. On the other hand, if a static limiter of the type used in known frequency modulation receivers were to be employed in the angle modulation channel of a stereophonic receiver, then the $(A-B)$ output signal level would remain substantially constant independent of wide changes in received carrier strength. Such condition of operation is undesirable because improper matrixing would result, which would introduce a portion of the A signal to the B speaker, and a portion of the B signal to the A speaker. The illusion of realism which a stereophonic system is capable of producing would be seriously impaired.

Therefore, in accordance with this invention, a dynamic limiting means is employed in a stereophonic signal receiver to provide automatic tracking between the average output signal levels in the amplitude modulation channel and angle modulation channel whereby two stereophonically related signals may be reproduced in substantially the same relationship as they had when picked up at the transmitter.

Furthermore, the dynamic limiting means and the detection means of the receiver, each having unilateral conducting devices in their respective circuits, are effectively isolated from a tuned circuit common to the amplitude modulated and angle modulated channels. Therefore, variations in conduction and impedance characteristics of the unilateral conducting devices do not introduce undesirable crosstalk and distortion components.

What is claimed is:

1. Apparatus for the translation of a carrier wave angle modulated by a first signal and amplitude modulated by a second signal stereophonically related to said first signal into stereophonically related audio signals bearing the same relative amplitude relationship as the modulating signals despite variations in carrier wave amplitude occurring at a rate below the lowest signal frequency, including a common processing channel for the carrier wave and the angle and amplitude modulated side bands, an envelope detector coupled to the common channel for recovering the amplitude modulating signal, an angle variation detector coupled to the common channel for recovering the angle modulating signal, the output signal level of said last-named detector being a function of both the amplitude and angle of the wave impressed upon its input, a dynamic limiter circuit including a unilateral conducting device and a time constant network for biasing the device, the time constant of the network being longer than the period of the lowest signal frequency, and means interposing the said limiter circuit in the coupling path between the common channel and the angle variation detector to set up a flow of current through the device and to develop a biasing potential across the network, said last-named means including an impedance element.

2. In apparatus for the processing of a wave concurrently amplitude and angle modulated by audible signals and subject to other amplitude variations, a dynamic limiter circuit for reducing the amplitude variations occurring at an audible rate without affecting the variations occurring at a subaudible rate including: a source of wave energy, a first resistor, a pair of diode devices having the cathode of one and the anode of the other connected to one terminal of said resistor, a capacitor, means connecting the anode of the one and the cathode of the other device to respective terminals of the capacitor, means connecting the other terminal of the resistor to the source whereby the capacitor is charged in the same direction through the resistor during both positive and negative excursions of the wave, a resistive element connected in shunt with the capacitor for discharging the capacitor, the relative values of the capacitor, the first resistor and the resistive element being such that the time constants of the resistor and capacitor and the element and capacitor are within the subaudible range.

3. In apparatus for the processing of a wave concurrently amplitude and angle modulated by audible signals and subject to other amplitude variations, a dynamic limiter circuit for reducing the amplitude variations occurring at an audible rate without affecting the variations occurring at a subaudible rate including: a source of wave energy, a first resistor, a pair of diode devices having the cathode of one and the anode of the other connected to one terminal of said resistor, a capacitor, means connecting the anode of the one and the cathode of the other device to respective terminals of the capacitor, means connecting the other terminal of the resistor to the source whereby the capacitor is charged in the same direction through the resistor during both positive and negative excursions of the wave, a resistive element connected in shunt with the capacitor for discharging the capacitor, the relative values of the capacitor, the first resistor and the resistive element being such that the time constants of the resistor and capacitor and the element and capacitor are within the subaudible range, and means coupled to said devices including a circuit resonant to the wave frequency for supplying an angle modulated output wave to an angle modulation detector.

4. In a stereophonic reciver for the reception of a carrier concurrently angle and amplitude modulated by stereophonically related signals, a limiter circuit for separating the angle modulation components from the amplitude modulation components and supplying a wave bearing the angle modulation components to an angle modulation detector said wave having an amplitude determined by the average strength of the received carrier including: a source of modulated carrier energy, a resistor, a pair of electron discharge devices, a capacitor, means coupling said devices to the source, and means intercoupling said resistor, devices and capacitor whereby the capacitor is charged by source energy through the devices and resistor, and biasing potentials are developed across the devices, resistive means for discharging the capacitor, the respective valves of the resistor, the capacitor, and the resistive means being so related that the biasing potentials developed across the devices vary in response to those variations in strength of the received carrier occurring at frequencies below the signal frequencies but remain substantially fixed for those variations in strength of the received carrier occurring at frequencies within the range of signal frequencies or above, an angle modulation detector, and means coupling the detector to the devices.

5. In a stereophonic receiver for the reception of a carrier concurrently angle and amplitude modulated by stereophonically related signals, a limiter circuit for separating the angle modulation components from the amplitude modulation components and supplying a wave bearing the angle modulation components to an angle modulation detector said wave having an amplitude determined by the average strength of the received carrier including: a source of modulated carrier energy, a resistor, a pair of electron discharge devices, and a capacitor, means coupling said devices to the source, and means intercoupling said resistor, devices and capacitor whereby the capacitor is charged by source energy through the devices and resistor, and biasing potentials are developed across the devices, resistive means for discharging the capacitor, the respective values of the resistor, the capacitor, and the resistive means being so related that the biasing potentials developed across the devices vary in response to those variations in strength of the received carrier occurring at frequencies below the signal frequencies but remain substantially fixed for those variations in strength of the received carrier occurring at frequencies within the range of signal frequencies or above, a circuit tuned to the carrier frequency, means coupling the circuit to said devices for developing an angle modulated wave across the circuit of an amplitude determined by the average amplitude of the source of modulated carrier energy, and angle modulation detection means coupled to said circuit.

6. A stereophonic signal receiver for a carrier wave modulated with information representative of the sum and difference of a pair of stereophonically related signals, which wave is subject to variations in average amplitude occurring at a rate below the lowest signal frequency comprising:

a common signal processing channel for said carrier wave, a first signal channel coupled to said common signal channel for signals corresponding to the sum of said stereophonic signals, a second signal channel coupled to said common signal channel for signals corresponding to the difference of said stereophonic signals, matrix circuit means coupled to receive signals from said first and said second signal channels for deriving resultant signals corresponding to said pair of stereophonically related signals, angle modulation detector means in said second channel the output signal level of which detector is a function of both the amplitude and angle of the wave impressed upon its input, a dynamic limiter circuit including, a unilateral conducting device and a time constant network for biasing the device, the time constant of the network being longer than the period of the lowest signal frequency, and means interposing the said limiter circuit in the coupling path between the common channel and the angle modulation detector means to set up a flow of current through the device and to develop a biasing potential across the network.

References Cited in the file of this patent

UNITED STATES PATENTS

| | | |
|---|---|---|
| 2,299,391 | Holmes | Oct. 20, 1942 |
| 2,329,558 | Scherbatskoy | Sept. 14, 1943 |
| 2,363,650 | Crosby | Nov. 28, 1944 |
| 2,698,379 | Boelens et al. | Dec. 28, 1954 |
| 2,779,020 | Wilmotte | Jan. 22, 1957 |
| 2,851,532 | Crosby | Sept. 9, 1958 |
| 2,892,080 | Chauvin et al. | June 23, 1959 |